United States Patent
Gaither et al.

(10) Patent No.: US 12,406,346 B2
(45) Date of Patent: Sep. 2, 2025

(54) VEHICLE ASSESSMENT SYSTEMS AND METHODS

(71) Applicant: Toyota Motor Engineering & Manufacturing North America, Inc., Plano, TX (US)

(72) Inventors: Geoffrey David Gaither, Ann Arbor, MI (US); Allison McGowan, Ann Arbor, MI (US); Nathan C. Westover, New Hudson, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 442 days.

(21) Appl. No.: 17/842,054

(22) Filed: Jun. 16, 2022

(65) Prior Publication Data
US 2023/0410271 A1    Dec. 21, 2023

(51) Int. Cl.
*G06V 10/40*    (2022.01)
*G06T 7/00*    (2017.01)

(52) U.S. Cl.
CPC .......... *G06T 7/0002* (2013.01); *G06V 10/40* (2022.01); *G06V 2201/08* (2022.01)

(58) Field of Classification Search
None
See application file for complete search history.

(56) References Cited

U.S. PATENT DOCUMENTS

| | | | |
|---|---|---|---|
| 8,732,032 B2 * | 5/2014 | Scruton | G06Q 30/0601 705/26.1 |
| 9,595,019 B1 * | 3/2017 | Marlow | G06F 16/9535 |
| 10,360,601 B1 * | 7/2019 | Adegan | G06Q 30/0283 |
| 11,238,506 B1 * | 2/2022 | Tomlinson | G06Q 10/0875 |
| 12,056,965 B1 * | 8/2024 | Marlow | G06N 20/00 |
| 2007/0228703 A1 | 10/2007 | Breed | |
| 2014/0107976 A1 | 4/2014 | Kallfelz et al. | |
| 2017/0148233 A1 | 5/2017 | Rajpathak et al. | |
| 2018/0204393 A1 | 7/2018 | Andolsi et al. | |
| 2018/0232964 A1 * | 8/2018 | Chen | G07C 5/008 |
| 2018/0260793 A1 * | 9/2018 | Li | G06Q 40/08 |
| 2018/0293552 A1 * | 10/2018 | Zhang | G06V 10/25 |
| 2020/0139983 A1 | 5/2020 | Petrak et al. | |
| 2020/0198650 A1 | 6/2020 | Ribbens | |

(Continued)

FOREIGN PATENT DOCUMENTS

| | | |
|---|---|---|
| CN | 201111052 Y | 9/2008 |
| CN | 112132448 A | 12/2020 |
| WO | 2021144206 A1 | 7/2021 |

*Primary Examiner* — Idowu O Osifade
(74) *Attorney, Agent, or Firm* — Dinsmore & Shohl LLP

(57) ABSTRACT

An assessment method for a vehicle part includes an identifying feature of the vehicle part with a visual detector. The assessment method includes identifying the vehicle part with a processing unit based on the identifying feature. The assessment method includes detecting a visual quality of the vehicle part with the visual detector. The assessment method includes calculating a present value of the vehicle part with the processing unit. The step of calculating the present value is based at least in part on the visual quality. The assessment method includes determining a recommended use of the vehicle part with the processing unit. The step of determining the recommended use is based on the present value.

8 Claims, 3 Drawing Sheets

(56) References Cited

U.S. PATENT DOCUMENTS

| | | |
|---|---|---|
| 2021/0150672 A1* | 5/2021 | Xu ............................. G06T 5/60 |
| 2021/0160459 A1* | 5/2021 | Kuruvilla ................. H04N 7/18 |
| 2021/0192867 A1 | 6/2021 | Fang et al. |
| 2021/0276576 A1 | 9/2021 | Ribbens |
| 2021/0284179 A1 | 9/2021 | Diamond et al. |
| 2022/0253910 A1* | 8/2022 | Murakami ......... G06Q 30/0278 |
| 2023/0012230 A1* | 1/2023 | Geyzersky ............. G06Q 10/10 |
| 2023/0144640 A1* | 5/2023 | Sato ..................... G07C 5/0841 |
| | | 701/33.4 |
| 2024/0013364 A1* | 1/2024 | Dai ........................ G06V 20/54 |

* cited by examiner

VEHICLE ASSESSMENT SYSTEMS AND METHODS

TECHNICAL FIELD

The present specification generally relates to vehicle assessment systems and associated methods.

BACKGROUND

Assessment of the quality and status of vehicles and, more specifically, vehicle parts, may be beneficial in some applications. In particular, it may be beneficial to assess the remaining life and value of used vehicle parts. Such assessment may minimize the risk of part failure due to overuse and may enable continued use of used vehicle parts when those used parts still have remaining life.

Conventional vehicle assessment systems are often based exclusively on predicted service life, which is typically a function of part age or mileage. These systems may therefore fail to recognize or make use of remaining part life one the part has exceeded the predicted service life. While some vehicle part assessments may take into account the physical quality of the parts as identified by an individual, these assessments are often labor intensive and reliant on the skill of the individual conducting the assessment. Accordingly, these assessments may be expensive, unreliable, and/or nonrepeatable.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In one non-limiting aspect, an assessment method for a vehicle part includes an identifying feature of the vehicle part with a visual detector. The assessment method includes identifying the vehicle part with a processing unit based on the identifying feature. The assessment method includes detecting a visual quality of the vehicle part with the visual detector. The assessment method includes calculating a present value of the vehicle part with the processing unit. The step of calculating the present value is based at least in part on the visual quality. The assessment method includes determining a recommended use of the vehicle part with the processing unit. The step of determining the recommended use is based on the present value.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
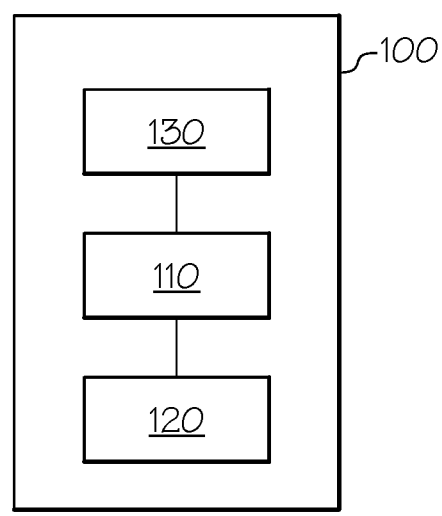
FIG. 1 schematically depicts a block diagram of an illustrative system for completing a vehicle assessment according to one or more embodiments shown and described herein.
Figure 2:
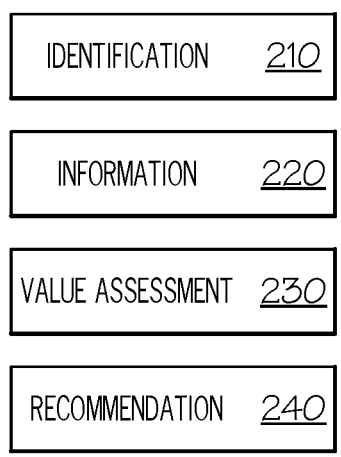
FIG. 2 depicts a flow diagram of an illustrative assessment method that may be performed with the system of FIG. 1 according to one or more embodiments shown and described herein.

Reference will now be made in detail to various embodiments of systems, devices, and methods, examples of which are illustrated in the accompanying drawings. Whenever possible, the same reference numerals will be used throughout the drawings to refer to the same or like parts. FIG. 1 schematically depicts an illustrative vehicle assessment system, which may include a visual detector, a processing unit, and a user interface. FIG. 2 schematically depicts an illustrative assessment method that may be performed with vehicle assessment system of FIG. 1. The assessment method may include detecting an identifying feature of a vehicle part with the visual detector; identifying the vehicle part based on the identifying feature; detecting a visual quality of the vehicle part with the visual detector; calculating a present value of the vehicle part with the processing unit; and determining a recommended use of the vehicle part with the processing unit based on the present value. The calculating of the present value may be based at least in part on the visual quality detected by the visual detector. Accordingly, the assessment method may be performed without subjective assessment from a person. In this way, the assessment method may be faster, less expensive, and more reliable than conventional assessments.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

FIG. 1 schematically depicts an exemplary vehicle assessment system 100. The vehicle assessment system 100 may generally include a processing unit 110, a user interface 120, and a visual detector 130.

The visual detector 130 may be a camera, scanner, light sensor, or any other detection device capable of detecting visual qualities. For example, in embodiments, the visual detector 130 may be a smart phone camera capable of sensing and capturing an image. In other embodiments, the visual detector 130 may be a scanner capable of scanning and identifying the vehicle identification number ("VIN") of a vehicle. The user interface 120 may be a graphical user interface 120 such as a computer program, smart phone application, or any other user interface capable of receiving an input from a user and providing a visual output to the user.

The processing unit 110 may be a computer or a software system capable of processing data received from the visual detector 130 and the user interface 120. For example, in some embodiments, the processing unit 110 may be a smart phone software application. In embodiments, the processing unit 110 may have wired or wireless internet or intranet capabilities. Accordingly, in such embodiments, the processing unit 110 may receive data from and/or upload data to an online source. For example, as will be described in greater detail herein, in some embodiments, the processing unit 110 may access and communicate with an online database.

The visual detector 130 and the user interface 120 may each be in electrical communication with the processing unit 110 such that the processing unit 110 may exchange data with the visual detector 130 and the user interface 120. It is noted that while the visual detector 130 and the user interface 120 are depicted as being in direct communication with the processing unit 110, in some embodiments, the communication may be indirect.

Referring to FIGS. 1 and 2 in combination, the vehicle assessment system 100 may be used to assess one or more vehicle parts or systems according to an assessment method 200. In particular, the assessment method 200 may include an identification step 210 wherein the vehicle part to be assessed is identified. For example, the identification step 210 may include using the visual detector 130 to detect a part number, serial number, bar code, or other identifying feature of the vehicle part. In some embodiments the visual detector 130 may be a scanner such as a barcode scanner or Quick Response ("QR") code reader configured to scan an identifying vehicle code or part code. In other embodiments, the visual detector 130 may be a camera configured to detect an identifying part feature or vehicle feature. For example, the visual detector 130 may capture an image of a VIN or part number. The visual detector 130 may output that data (e.g. image data of the part number) to the processing unit 110 which may compare the image to a reference image database and/or use a machine learning algorithm to identify the part or the vehicle.

The assessment method 200 may include an information step 220 wherein information relating to the vehicle part is determined. For example, the processing unit 110 may retrieve information associated with the identified part or vehicle from a known database of vehicle and vehicle part information.

The database may be a local database or may be a shared database accessible via internet or intranet connection. The known database may include vehicle information and/or part information. The known database may include information associated with the original configuration and/or information associated with aftermarket parts. Accordingly, in some embodiments, the processing unit 110 may determine whether the vehicle part is an original configuration part or whether the vehicle part is an aftermarket part or other replacement part. In some embodiments, the known database may include only model-specific part information such as the design dimensions, manufacturer, rated mileage, and the like. In other embodiments, the known database may include, alternatively or additionally, part-specific part information, such as the actual dimensions, build number, date of install, and the like. In some embodiments, part-specific or vehicle-specific information may be supplied to the processing unit 110 via the user interface 120. For example, a user may input vehicle mileage, services dates, and the like via the user interface 120. The supplied information may be added to the known database.

Still referring to FIGS. 1 and 2, the assessment method 200 may include a value assessment step 230. The value assessment step 230 may include using the visual detector 130 and the processing unit 110 to identify visual traits of the vehicle part. For example, the visual detector 130 may detect an image or a series of images of the vehicle part. The processing unit 110 may then analyze the image or series of images for signs of cracks, oxidation, pitting, dents, or other signs of damage. For example, in some embodiments, the processing unit 110 may use reference images and/or a machine learning algorithm to identify portions of the image or series of images that correspond to signs of damage. In some embodiments, the processing unit 110 may use the number of distinct signs of damage and/or the size or extent of signs of damage to ascribe a numerical value or quality. For example, in some embodiments, a vehicle part with no identified signs of damage may be given a quality score of 200 while a vehicle part with significant cracking and significant oxidation may be given a quality score of 0.

In some embodiments, the processing unit 110 may compute a present value of the vehicle part by scaling a generic estimated value by the quality score. The generic estimated value may be a generic remaining mileage (e.g. the rated mileage of the vehicle part minus the actual mileage of the vehicle part). Accordingly, a vehicle part with no identified signs of damage may be scaled up based on its high quality score to yield a present value that is higher than the generic estimated value while a vehicle part with significant signs of damage may be scaled down to yield a present value that is lower than the generic estimated value.

In some embodiments, the processing unit 110 may identify the signs of damage as repairable or non-repairable. In some embodiments, the processing unit 110 may compute an estimated repair cost based on the signs of damage and known costs of labor and materials. The processing unit 110 may then compute a repair value based on an estimated value of the repaired part minus the estimated repair cost. Accordingly, in such embodiments, the value assessment step 230 may include a present value assessment and a repair value assessment.

Figure 3:
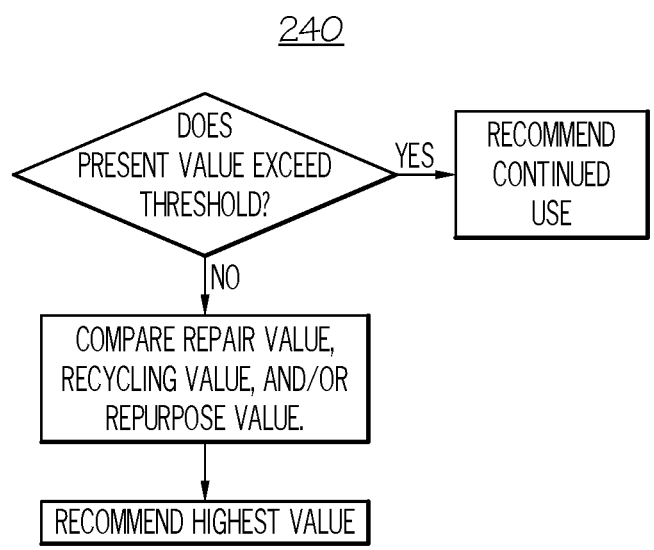
FIG. 3 depicts a flow diagram of an illustrative recommendation step of the assessment method of FIG. 2 according to one or more embodiments shown and described herein.

Referring now to FIGS. 1-3 in combination, the assessment method 200 may include a recommendation step 240. The recommendation step 240 may include using the processing unit 110 to identify a recommended use for the vehicle part and communicating the recommendation to the user via the user interface 120. The recommended use may be determined using the quality assessment from the value assessment step 230. FIG. 3 schematically illustrates an illustrative embodiment of how such a recommended use may be determined. For example, as shown in FIG. 3, if the present value of the vehicle part exceeds a threshold, then the processing unit 110 may recommend continued use of the vehicle part. Conversely, if the present value is less than the threshold, then the processing unit 110 may continue to assess other options.

For example, the processing unit 110 may compare the estimated repair value to the estimated recycling value (e.g. the raw material value) and to any known repurpose value (e.g. the estimated economic value of using the vehicle part in a different manner or application). The processing unit 110 may determine which option has the highest economic value and may recommend that option to the user via the user interface 120. Accordingly, in some embodiments, this may be considered a 4R strategy, wherein the processing unit 110 may select a recommended use from the group of continued use (or "re-use"), repair, recycle, and repurpose. As a result of receiving a recommended use from the processing unit 110 via the user interface 120, the user may act on or effectuate the recommended use. In this way, the assessment method 200 may effectively optimize the use of the vehicle part for maximum value or, in other words, to manage the lifecycle of the vehicle part. Accordingly, the assessment method 200 may be considered a lifecycle management method. Importantly, because the assessment method 200 is not reliant on a quality assessment performed subjectively by a person, the assessment method 200 may be faster, less expensive, and more reliable than conventional assessments.

In view of the above, it should now be understood that at least some embodiments of the present disclosure are directed to an assessment method for a vehicle part that may include detecting an identifying feature of the vehicle part with a visual detector in communication with a processing unit; identifying the vehicle part based on the identifying feature; detecting a visual quality of the vehicle part with the visual detector; calculating a present value of the vehicle part with the processing unit; and determining a recommended use of the vehicle part with the processing unit based on the present value. The calculating of the present value may be based at least in part on the visual quality.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assessment method for a vehicle part, comprising:
   detecting an identifying feature of the vehicle part with a visual detector;
   identifying the vehicle part with a processing unit based on the identifying feature;
   detecting a visual quality of the vehicle part with the visual detector, comprising:
   identifying an extent of damage of the vehicle part, and
   computing a numerical value based on the extent of damage;
   generating a quality score based on the extent of damage and the numerical value;
   calculating a present value of the vehicle part with the processing unit, wherein the calculating of the present value includes scaling a generic estimated value by the quality score, the generic estimated value being a generic remaining mileage that is a rated mileage of the vehicle part minus an actual mileage of the vehicle part; and
   determining a recommended use of the vehicle part with the processing unit, wherein determining the recommended use is based on the present value.

2. The assessment method of claim 1, wherein determining the recommended use comprises:
   comparing the present value to a threshold, wherein the recommended use is continued use if the present value exceeds the threshold.

3. The assessment method of claim 1, further comprising determining whether the vehicle part is an original configuration part.

4. The assessment method of claim 1, further comprising determining whether the vehicle part is an aftermarket part.

5. The assessment method of claim 1, wherein determining the recommended use comprises selecting a recommendation from a group of continued use of the vehicle part, repair of the vehicle part, recycling of the vehicle part, and repurpose of the vehicle part.

6. The assessment method of claim 1, wherein the assessment method further comprises retrieving part information from a database.

7. The assessment method of claim 6, wherein the identifying feature detected by the visual detector is used when retrieving the part information from the database.

8. The assessment method of claim 1, further comprising effectuating the recommended use, wherein effectuating the recommended use is performed by a user.

* * * * *

UNITED STATES PATENT AND TRADEMARK OFFICE
CERTIFICATE OF CORRECTION

| | |
|---|---|
| PATENT NO. | : 12,406,346 B2 |
| APPLICATION NO. | : 17/842054 |
| DATED | : September 2, 2025 |
| INVENTOR(S) | : Geoffrey David Gaither, Allison McGowan and Nathan C. Westover |

Page 1 of 1

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

Column 2, item (56), U.S. patent documents, cite no. 9, delete "Andolsi et al." and insert --Landolsi et al.--, therefor.

In the Specification

In Column 1, Line(s) 21, delete "one" and insert --once--, therefor.

In Column 2, Line(s) 29, after "with", insert --the--.

In Column 4, Line(s) 11, after "part-specific", delete "part".

Signed and Sealed this
Fourteenth Day of October, 2025

John A. Squires
*Director of the United States Patent and Trademark Office*